United States Patent [19]
Ishimaru et al.

[11] 3,890,314
[45] June 17, 1975

[54] PROCESS FOR PRODUCING 7-ACYLAMINO-3-METHYL-3-CEPHEM-4-CARBOXYLIC ACIDS

[75] Inventors: Toshiyasu Ishimaru, Suita; Yutaka Kodama, Toyama, both of Japan

[73] Assignee: Toyama Chemical Co., Ltd., Japan

[22] Filed: Aug. 7, 1973

[21] Appl. No.: 386,355

[30] Foreign Application Priority Data
Sept. 1, 1972 Japan................................. 47-87816

[52] U.S. Cl............................. 260/243 C; 424/246
[51] Int. Cl............................................. C07d 99/24
[58] Field of Search...................... 260/243 C, 609 R

[56] References Cited
UNITED STATES PATENTS

| | | | |
|---|---|---|---|
| 2,116,182 | 5/1938 | Baur................................. | 260/609 R |
| 2,378,968 | 6/1945 | Axe.................................. | 260/609 R |
| 3,275,626 | 9/1966 | Morin et al...................... | 260/243 C |
| 3,725,397 | 4/1973 | Graham et al.................. | 260/243 C |
| 3,725,399 | 4/1973 | Ellerton et al.................. | 260/243 C |
| 3,786,128 | 1/1974 | Murib et al..................... | 260/609 R |

*Primary Examiner*—Donald G. Daus
*Assistant Examiner*—Jose Tovar
*Attorney, Agent, or Firm*—Oblon, Fisher, Spivak, McClelland & Maier

[57] ABSTRACT

A 7-Acylamino-3-methyl-3-cephem-4-carboxylic acid is prepared by first forming a 7-acylamino-3-methyl-3-cephem-4-carboxylic acid ester by heating a 6-acylaminopenicillanic acid ester S-oxide in the presence of a catalyst consisting of an acid and a sulfide and then deesterifying the intermediate 7-acylamino-3-methyl-3-cephem-4-carboxylic acid ester.

10 Claims, No Drawings

PROCESS FOR PRODUCING 7-ACYLAMINO-3-METHYL-3-CEPHEM-4-CARBOXYLIC ACIDS

BACKGROUND OF THE INVENTION

1. Field of the Invention:

This invention relates to an improved process for producing 7-acylamino-3-methyl-3-cephem-4-carboxylic acids. More particularly the invention relates to an industrially feasible process for producing 7-acylamino-3-methyl-3-cephem-4-carboxylic acid esters represented by the following formula (I):

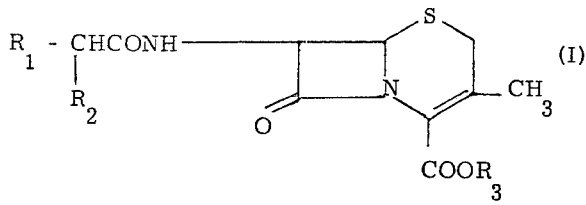

and 7-acylamino-3-methyl-3-cephem-4-carboxylic acids represented by the following formula (II):

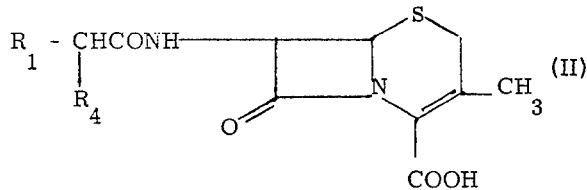

wherein $R_1$ represents hydrogen, lower alkyl, aryl or aryloxy; $R_2$ represents hydrogen, lower alkyl, halogen, azido or N-protected amino groups; $R_3$ represents an ester moiety; and $R_4$ is the same as $R_2$ or it can also represent an amino group. The compounds represented by formulas (I) and (II) are useful as antibiotic substances against Gram-positive and Gram-negative bacteria, and are also useful as intermediates for the preparation of other antibiotics effective against the same bacteria.

2. Description of the Prior Art:

Several methods in the past have been used for producing compounds of formula (I) from penicillin ester S-oxides. Compounds of formula (I) have reportedly been prepared by heating penicillin ester S-oxides:

1. in the presence of an acid catalyst such as acetic anhydride, 4-toluenesulfonic acid, or the like (U.S. Pat. No. 3,275,626);

2. in a solvent such as a tertiary carboxyamide or tertiary urea in the presence of an acid catalyst such as acetic anhydride, or the like (British Pat. No. 1,204,972 and Japanese Pat. Publication No. 25072/72);

3. in the presence of the salt of an acid such as phosphoric acid, organo phosphonic acids, organo sulfonic acids, or the like and an organic nitrogen base having a pKb not less than 4 (West German Patent Disclosure No. 2,011,376, South Africa Pat. No. 7001627, and Belgian Pat. No. 747,119); and 4. in the presence of an acid such as mono-O-substituted-ortho-phosphoric acid, O,O-di(aryl-substituted)-orthophosphoric acid, or an organic tertiary amine salt thereof (West German Pat. Disclosure No. 2,011,351). The yields of product from methods 1 and 2 have been very poor (as low as less than 10%), although method 2 is somewhat better than the procedure of method 1. At present, the most preferred industrial methods are those of procedures 3 and 4.

A need, therefore, continues to exist for an industrially acceptable process for producing 7-acylamino-3-methyl-3-cephem-4-carboxylic acids in high yields.

SUMMARY OF THE INVENTION

Accordingly, one object of the present invention is to provide a process for producing compounds of formula (I) from penicillin ester S-oxides.

Another object of the present invention is to provide a process for producing compounds of formula (I) by heating penicillin ester S-oxides in the presence of a catalyst consisting of a mixture of acids and sulfides.

Still another object of the present invention is to provide a process for producing compounds of formula (II) by deesterification of the compounds of formula (I).

Briefly, these objects and other objects as hereinafter will become more readily apparent can be attained by a process for preparing a 7-acylamino-3-methyl-3-cephem-4-carboxylic acid by initially forming a 7-acylamino-3-methyl-3-cephem-4-carboxylic acid ester by heating a 6-acyl-aminopenicillanic acid ester S-oxide in the presence of a catalyst consisting of an acid and a sulfide and then deesterifying the intermediate 7-acylamino-3-methyl-3-cephem-4-carboxylic acid ester.

DESCRIPTION OF THE PREFERRED EMBODIMENTS

The general reaction scheme of the process of this invention can be represented as follows:

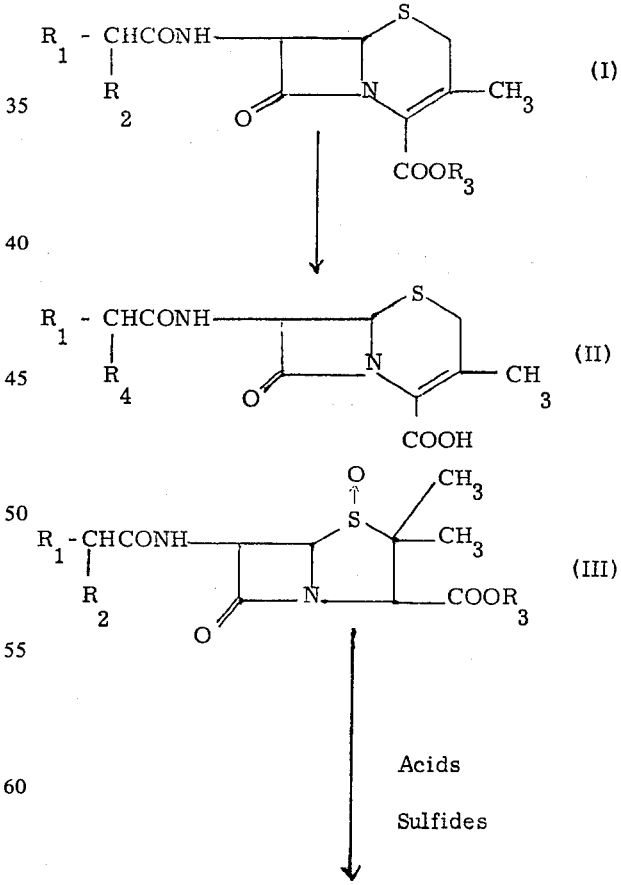

Penicillin ester S-oxides of formula (III) as the starting materials for the process of the present invention are easily produced by conventional methods. That is, they are prepared by oxidizing the penicillin compound which corresponds to the compound of formula (III).

This is followed by esterification or oxidation of the corresponding penicillin esters.

In the formulas of the reactive sequence depicted, $R_1$ represents hydrogen, lower alkyl, aryl or aryloxy and substituted groups thereof. $R_2$ represents hydrogen, lower alkyl such as methyl, ethyl, propyl, or the like, halogen such as chlorine, bromine, or the like, or azido or N-protected amino groups. (The term "lower alkyl" throughout the specification refers to alkyl groups containing from 1 – 5 carbon atoms.) Suitable protecting groups for the amino group include tert-butoxycarbonyl, tert-pentyloxycarbonyl,$\beta,\beta,\beta$-trichloroethoxycarbonyl,$\beta,\beta,\beta$-tribromoethoxycarbonyl, ethoxycarbonyl, 2,4-dinitrophenoxycarbonyl, benzyloxycarbonyl, halogen, nitro, hydroxyl, alkyl or methoxy-substituted-benzyloxycarbonyl, benzhydryloxycarbonyl, cyclopentyloxycarbonyl, furfuryloxycarbonyl, formyl, trifluoroacetyl, phthaloyl, succinoyl, diphenylmethyl, trityl, bis(4-methoxyphenyl)methyl, bis(4-methoxyphenyl)phenylmethyl, toluenesulfonyl, 2-nitrophenylsulfenyl, 2,4-dinitrophenyl-sulfenyl, salicylidene, benzylidene, 4-nitrobenzylidene, or an enamine with $\beta$-diketone or $\beta$-keto-acid derivatives such as, for example, the enamine of acetoacetic ester, acetoacetamides, acetylacetone, benzoylacetone, $\alpha$-formylpropionic acid ester, 2-acetylcyclopentanone and 2-acetylcyclohexanone.

$R_3$ represents an ester moiety which includes substituted or unsubstituted alkyl, alkenyl, alkinyl, aryl, aralkyl, acyloxyalkyl, alkyloxycarbonylalkyl, aryloxycarbonylalkyl, acylalky, acylamino, acylamino alkyl, mono- or di-substituted imino groups or the like. The most easily deesterified protecting groups of the listed ester moieties include, for example, 4 – 6 carbon tert-alkyl groups such as tert-butyl, tert-pentyl, and tert-hexyl; 5 – 7 carbon tert-alkenyl groups such as tert-pentenyl; 5 – 7 carbon tert-alkinyl groups such as tert-pentinyl; $\beta$-iodoethyl, cyanomethyl, $\beta,\beta$-dibromoethyl,$\beta,\beta,\beta$-trichloroethyl,$\beta,\beta,\beta$-tribromoethyl, pentachlorophenyl, 4-methylthiophenyl, furfuryl, benzyl, 3- or 4-nitrobenzyl, 3- or 4-methoxybenzyl, 2,4-dinitrobenzyl, 4-chlorobenzyl, 3,5-di(tert-butyl)-4-hydroxybenzyl, bis-(4-methoxyphenyl)methyl, bis-(4-methoxyphenyl)-phenylmethyl, diphenyl methyl, trityl, phenacyl, 4-chlorophenacyl, 4-phenylphenacyl, 3- or 4-nitrophenacyl, methanesulfonylphenacyl, naphthoylmethyl, furoylmethyl, thenoylmethyl, benzoyloxymethyl, pivaloyloxymetheyl, acetoxymethyl, 4-nitrobenzoyloxymethyl, succinimido, succinimidomethyl, phthalimido, phthalimidomethyl, isopropylideneimino, benzylideneimino, furfurilidenimino, and cyclohexylideneimino.

The acids which are used as the catalyst in the first reactive step of the process of this invention preferably include inorganic phosphoric acids, organic phosphoric acids, organic sulfonic acids, mineral acids and Lewis acids. Suitable inorganic phosphoric acids include, for example, orthophosphoric acid, polyphosphoric acid, pyrophosphoric acid, and phosphorous acid. Suitable organic phosphoric acids include, for example, aliphatic phosphonic acids such as methanephosphonic acid, ethanephosphonic acid, dichloromethanephosphonic acid, trichloromethanephosphonic acid, and iodomethanephosphonic acid; aromatic phosphonic acids such as benzenephosphonic acid, bromobenzenephosphonic acid, nitrobenzenephosphonic acid, and the like; mono-O-alkylorthophosphoric acid, mono-O-arylorthophosphoric acid, mono-O-aralkylorthophosphoric acid, O,O-dialkylorthophosphoric acid, O,O-diarylorthophosphoric acid, O,O-diaralkylorthophosphoric acid (the alkyl, aryl, and aralkyl groups may be substituted by halogen, nitro, alkyl, alkoxy, or cyano groups or the like), amidophosphoric acids such as trichloroacetamidophosphoric acid, benzamidophosphoric acid, and the like; sulfonamidophosphoric acids such as naphthalenesulfonamidophosphoric acid, 4-toluenesulfonamidophosphoric acid, methanesulfonamidophosphoric acid, and tetrakis(trichloroethyl)-pyrophosphate. Suitable organic sulfonic acids include, for example, methanesulfonic acid, 4-toluenesulfonic acid and naphthalenesulfonic acid. Suitable Lewis acids include, for example, zinc chloride, stannous chloride, stannic chloride, boron trifluoride, boron trichloride, ferric chloride, ferrous chloride, bismuth trichloride, aluminum chloride, aluminum bromide, dimethoxyaluminum chloride, monomethoxyaluminum dichloride, titanium tetrachloride, silicon tetrachloride and zirconium tetrachloride. The Lewis acids may be used as an anhydride or hydrate, or in the form of double salt with an alkali halide such as potassium chloride, potassium bromide, ammonium chloride or ammonium bromide. Suitable mineral acids include, for example, sulfuric acid, hydrochloric acid and hydrobromic acid.

The sulfide component of the catalyst of the invention are those sulfides represented by the following formula

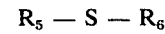

$$R_5 - S - R_6$$

(IV)

In formula (IV), $R_5$ and $R_6$ represent substituted or unsubstituted alkyl, alkenyl, alkinyl, cycloalkyl, aryl aralkyl or heterocyclic groups, or $R_5$ and $R_6$ may jointly form saturated or unsaturated heterocyclic rings together with the sulfur atom between them or with additional hetero atoms such as sulfur, oxygen and nitrogen. Suitable $R_5$ and $R_6$ substituents include halogen, hydroxyl, cyano, aldehyde, carboxyl, alkoxycarbonyl, mercapto, nitro, amino, mono- or di-substituted-amino groups or —Y—$R_7$ groups wherein Y represents oxygen or sulfur and $R_7$ represents alkyl, aryl, or aralkyl. Suitable sulfide catalyst components within the scope of formula (IV) include methylethylsulfide, methylpropylsulfide, methylbutylsulfide, methylpentylsulfide, methylhexylsulfide, methyloctylsulfide, methylcetylsulfide, diethylsulfide, ethylpropylsulfide, ethylbutylsulfide, ethylpentylsulfide, ethylhexylsulfide, ethyloxtylsulfide, ethyloctylsulfide, dipropylsulfide, dibutylsulfide, propylbutylsulfide, propylpentylsulfide, propylhexylsulfide, dipentylsulfide, dihexylsulfide, dioctylsulfide, didecanylsulfide, methylcyclohexylsulfide, ethylcyclohexylsulfide, 3,3,5-trimethylcyclohexylmethylsulfide, di(dichloromethyl)sulfide, chloromethylethylsulfide,$\beta,\beta'$-dichlorodiethylsulfide, $\beta$-hydroxyethylmethylsulfide, bis[$\beta$-hydroxyethyl]-sulfide, $\gamma$-hydroxypropylmethylsulfide, $\beta$-chloroethyl$\beta$-hydroxyethylsulfide, diallylsulfide, divinylsulfide, thiodiglycolic acid or thiodiglycolic acid ester,$\beta,\beta'$-thiodipropionic acid or $\beta,\beta'$-thiodipropionic acid ester,$\alpha,\alpha'$-thiodipropionic acid or $\alpha,\alpha'$-thiodipropionic acid ester, (dodecoxy carbonylethyl)sulfide bis($\beta$-cycanoethyl)-sulfide, bis($\beta$-nitroethyl)sulfide, bis($\beta$-mercaptoethyl)-sulfide, bis($\beta$-aminoethyl)sulfide, bis($\beta$-methylthiopropyl)sulfide, $\beta$-methoxyethylethylsulfide,$\beta$-methylthioethylethylsulfide, propargylethylsulfide, benzylmethylsulfide, benzylethylsulfide, phenylmethylsulfide, phenylethylethylsulfide, phenylmethylsulfide, phenylethylsulfide, diphenylsulfide, thietane, tetrahydrothiophene, pentamethylenesulfide, 1,4- oxythian, 1,4-dithian, thiophene, thionaphthene, sym-trithian, 2,4,6-trimethyl-symtrithian, 2,2,4,4,6,6-hexamethyl-sym-trithian, pyridylmethylmethylsulfide, 2-ethylthio-4-methylpyrimidine, phenylthiazole, phenyl-1,3-oxathiol-2-one and 1,4-thiazane.

In one embodiment of the process of the present invention compounds of formula (I) are produced from compounds of formula (III) by dissolving the compound of formula (III) in an inert organic solvent such as dioxane, dimethylformamide, an alcohol, a ketone, benzene, toluene, xylene, chlorobenzene, an ester such as propyl acetate, butyl acetate, or the like, trimethylphosphate, triethylphosphate, or the like, or mixtures of at least two of the solvents, and then an acid and a sulfide are added thereto, and the mixture is heated. The reaction is preferably conducted in a solvent such as toluene, tert-amylalcohol or dioxane. The amount of the catalyst used depends upon the components used, and the type and amount of the solvent. However, from 0.05 to 0.2 mole of an acid and from 0.01 to 0.3 mole of a sulfide are ordinarily used per mole of the starting compound of formula (III). It is particularly preferable that the sulfide component of the catalyst system be used in equimolar amounts relative to the acid component or slightly in excess of the molar amount of acid. The reaction is preferably conducted at 80° to 130°C for 2 to 20 hours. However, these process conditions are not critical. The particular derivative of compound (III) used and the type and quantity of catalyst and solvent used are the factors which ultimately determine the reaction conditions.

After reacting the components of the reaction mixture, the solvent is evaporated from the mixture under reduced pressure, and an inert solvent such as water, methanol, ethanol, ethyl acetate, or the like is added to the residue. The crystals which precipitate are collected by filtration and a compound of formula (I) is isolated. Alternatively, if the crystals do not precipitate from solution, the residue is poured into ice water, and is extracted with inert solvent such as methylene chloride, chloroform, carbon tetrachloride, ethylene chloride, ethyl acetate, methylisobutylketone, or the like. The extract is then evaporated and the compound of formula (I) is isolated. The product compound does not have to be isolated from solution, but may remain in solution for the deesterification reaction which follows.

The deesterification of the compound of formula (I) is conducted by one of several procedures the choice of which depends upon the type of ester used.

1. Esters of compound (I) containing a 3,5-di(tert-butyl)-4-hydroxybenzyl, phenacyl, chlorophenacyl, nitrophenacyl, 4-phenylphenacyl, naphthoylmethyl, furoylmethyl, thenoylmethyl, methanesulfonylphenacyl, succinimido, phthaloylimido, succinimidomethyl, phthalimidomethyl, isopropylideneimino, benzylideneimino, furfurylideneimino, or the like group are deesterified by the basic hydrolysis of the ester with an alkali or alkaline earth metal salt of a carboxylic acid; or an amine salt or an alkali or alkaline earth metal salt of phenol, thiophenol, thiocyanic acid; or an organic amine.

2. Esters of compound (I) containing a tert-butyl, tert-pentyl, tert-hexyl, tert-pentenyl, tert-heptynyl, bis(4-methoxyphenyl)methyl, bis(4-methoxyphenyl)-phenylmethyl, trityl, or the like group are deesterified by acidic hydrolysis with formic acid, trifluoroacetic acid, hydrochloric acid, hydrobromic acid, or the like.

3. Esters of compound (I) containing a $\beta$-iodoethyl, $\beta,\beta$-dibromoethyl, trihaloethyl, or the like group are deesterified by chemical reduction with zinc, aluminum or an alloy containing these metals or an amalgam and a mineral acid or carboxylic acid; sodium, potassium or aluminum amalgam in moistened ether or a lower alkanol; or with an alkali metal or an alkaline earth metal in liquid ammonia.

4. Esters of compound (I) containing a benzyl, nitrobenzyl, halobenzyl, benzhydroxyl, or the like group are deesterified by catalytic reduction in the presence of catalyst such as palladium, platinum, nickel, or the like.

Free carboxylic acids with the formula (II) are produced by the deesterification procedures indicated. However, sometimes when $R_2$ is an azido group, reduction of the azido group to an amino group simultaneously occurs with the deesterification reaction. When $R_2$ is an N-protected amino group, removal of the protecting group sometimes simultaneously occurs with the deesterification treatment depending, of course, on the type of protecting group used.

Having generally described this invention, a further understanding can be obtained by reference to certain specific examples which are provided herein for purpose of illustration only and are not intended to be limiting unless otherwise specified.

EXAMPLE 1

1. A 4.82 g quantity of the $\beta,\beta,\beta$-trichloroethyl ester of penicillin-G.S-oxide, 98 mg of 98%-orthophosphoric acid and 160 mg of diethylsulfide were dissolved in 25 ml of dioxane, and the mixture was reacted at 95° to 100°C for 12 hours. Thereafter, the solvent was evaporated, and ethanol was added to the residue and the treated residue was allowed to stand in order to cool. The crystals obtained were filtered, and 4.0 (86.5%) of white crystals of the $\beta,\beta,\beta$-trichloroethyl ester of 7-phenylacetamido-3-methyl-3-cephem-4-carboxylic acid having a melting point of 160° to 161°C were obtained.

Table I shows the yields obtained for the same reaction wherein the sulfide component of the catalyst was varied in each instance.

TABLE I

| Sulfides | Yields |
| --- | --- |
| $(CH_3)_2CH-S-C_2H_5$ | 81.2% |
| $NOR-C_6H_{13}-S-C_2H_5$ | 83.2% |
| $(ClCH_2CH_2)_2S$ | 80.5% |
|  $-S-C_2H_5$ | 76.5% |
|  $-S-C_2H_5$ | 61.7% |
|  $-CH_2-S-C_2H_5$ | 76.1% |
|  | 81.5% |
|  | 58.6% |

TABLE I—Continued

| Sulfides | Yields |
|---|---|
| benzothiophene | 61.2% |
| 1,3-dithiolane (S-S-S ring) | 68.5% |
| 2,2-dimethyl-1,3-dithiolane (CH₃ substituted) | 53.2% |
| hexamethyl dithiane derivative | 51.0% |
| 1,4-oxathiane | 79.0% |

2. A solution of 3 ml of dimethylformamide containing 2.4 ml of acetic acid and 3 g of the β,β,β-trichloroethyl ester of 7-phenylacetamido-3-methyl-3-cephem-4-carboxylic acid was added to a suspension of 1.2 g of zinc powder in 3 ml of dimethylformamide at −5°C over a period of 1 hour. After the addition, the mixture was reacted for 1 hour, and insoluble materials were filtered, and the mother liquor was diluted with 30 ml of acetone. The white crystals obtained were filtered and the filtrate was suspended in 15 ml of 90% acetone. Hydrochloric acid was added to the acetone solution until the solution became transparent. After the acetone was evaporated under reduced pressure, 1.9 g (90%) of white crystals of 7-phenylacetamido-3-methyl-3-cephem-4-carboxylic acid having a melting point of 187° – 189°C were obtained.

EXAMPLE 2

A 4.82 g quantity of the β,β,β-trichloroethyl ester of penicillin-G.S-oxide, 98 mg of pyrophosphoric acid and 16 mg of diethylsulfide were dissolved in 25 ml of dioxane, and the mixture was reacted at 95°C to 100°C for 12 hours. The procedure of Example 1-(1) was repeated under the same reaction conditions, and 3.7 g (79.3%) of the β,β,β-trichloroethyl ester of 7-phenylacetamido-3-methyl-3-cephem-4-carboxylic acid were obtained.

Table II shows the yields obtained for the same reaction wherein the acid component of the catalyst system was varied in each instance.

TABLE II

| Acids | Yields |
|---|---|
| Polyphosphoric acid | 82.5% |
| C₆H₅-P(O)(OH)₂ | 51.2% |
| C₆H₅-O-P(O)(OH)₂ | 78.2% |
| Cl₃CCH₂OP(O)(OH)₂ | 86.5% |
| [(Cl₃CCH₂O)₂P]₂O | 67.8% |
| C₆H₅-CONHP(O)(OH)₂ | 65.2% |
| CH₃-C₆H₄-SO₂NHP(O)(OH)₂ | 71.1% |
| C₂H₅-O-P(O)(OH)₂ | 83.2% |

The procedure of Example 1-(2) was repeated for each of the esters produced in Table II under the same reaction conditions to produce 7-phenylacetamido-3-methyl-3-cephem-4-carboxylic acid.

EXAMPLE 3

A 4.82 g amount of the β,β,β-trichloroethyl ester of penicillin-G.S-oxide, 49 mg of 98%-orthophosphoric acid and 140 mg of diethylsulfide were dissolved in 35 ml of tert-amylalcohol, and the mixture was reacted at 98° to 102°C for 11 hours. Afterwards, the solvent was evaporated under reduced pressure and ethanol was added to the residue. Thereafter, the mixture was allowed to stand to cool. The crystals obtained were filtered, and 3.5 g (75%) of the β,β,β-trichloroethyl ester of 7-phenylacetamido-3-methyl-3-cephem-4-carboxylic acid were obtained. The deesterification procedure of Example 1-(2) was repeated with the ester produced under the same reaction conditions, and 7-phenylacetamido-3-methyl-3-cephem-4-carboxylic acid was obtained.

EXAMPLE 4

A 4.82 g amount of the β,β,β-trichloroethyl ester of penicillin-G.S-oxide, 49 mg of 98%-orthophosphoric acid and 140 mg of diethylsulfide were suspended in a mixed solvent of 48 ml of toluene and 1 ml of trimethylphosphate, and the suspension was reacted at 105° to 110°C for 8 hours. After the reaction mixture was washed with water, the solvent was evaporated under reduced pressure. Ethanol was added to the residue obtained and the mixture was allowed to stand to cool. The crystals obtained were filtered and 3.6 g (77.1%) of the β,β,β-trichloroethyl ester of 7-phenylacetamido-3-methyl-3-cephem-4-carboxylic acid were obtained. The deesterification procedure of Example 1-(2) was repeated for the ester obtained under the same reaction conditions, and the product, 7-phenylacetamido-3-methyl-3-cephem-4-carboxylic acid was obtained.

EXAMPLE 5

A 4.82 g amount of the β,β,β-trichloroethyl ester of penicillin-G.S.-oxide, 49 mg of 98%-orthophosphoric acid and 280 mg of diethylsulfide were dissolved in 25 ml of butyl acetate, and the mixture was reacted at 94° to 97°C for 7 hours. The procedure of Example 1-(1) was repeated under the same reaction conditions, and 2.9 g (62.0%) of the β,β,β-trichloroethyl ester of 7-phenylacetamido-3-methyl-3-cephem-4-carboxylic acid were obtained. The deesterification procedure of Example 1-(2) was repeated for the ester obtained under the same reaction conditions, and the product, 7-phenylacetamido-3-methyl-3-cephem-4-carboxylic acid was obtained.

EXAMPLE 6

1. A 5.0 g amount of the β,β,β-trichloroethyl ester of penicillin-V. S-oxide, 89 mg of 98%-orthophosphoric acid and 200 mg of dipropylsulfide were dissolved in 25 ml of dioxane, and the mixture was reacted at 95° to 100°C for 12 hours. The procedure of Example 1-(1) was repeated under the same reaction conditions, and 4.0 g (83.3%) of the β,β,β-trichloroethyl ester of 7-phenoxyacetamido-3-methyl-3-cephem-4-carboxylic acid were obtained.

2. A solution of 3 ml of dimethylformamide containing 2.4 ml of acetic acid and 3 g of the crude β,β,β-trichloroethyl ester of 7-phenoxyacetamido-3-methyl-3-cephem-4-carboxylic acid obtained by procedure 6-(1) was added to a suspension of 1.2 g of zinc powder in 3 ml of dimethylformamide at −5°C over a period of 1 hour. After addition of the components, the mixture was further reacted for 1 hour at the same temperature, and the insoluble material was filtered. The mother liquor was diluted with 60 ml of ethyl acetate. The precipitated white crystals were filtered, and the filtrate was suspended in 10 ml of water and was adjusted to a pH of 2.0 with dilute hydrochloric acid. The suspension was stirred, and the crystals obtained were filtered to yield 1.65 g of white crystals of 7-phenoxyacetamido3-methyl-3-cephem-4-carboxylic acid having a melting point of 185° to 186°C.

EXAMPLE 7

1. A 4.85 g amount of the 4-nitrobenzyl ester of penicillin-G.S.-oxide, 69 mg of 98%-orthophosphoric acid and 200 mg of dipropylsulfide were dissolved in 25 ml of dioxane, and the mixture was reacted at 95° to 100°C for 12 hours. The procedure of Example 1-(1) was repeated under the same reaction conditions, and 3.6 g (77.2%) of the 4-nitrobenzyl ester of 7-phenylacetamido-3-methyl-3-cephem-4-carboxylic acid were obtained. 2. A 2 g amount of the crystals thus obtained were dissolved in 50 ml of ethanol, and 2 g of palladium on carbon were added to the solution. The catalytic reduction was conducted under 5 to 10 atm. of hydrogen pressure. After the reaction, the catalyst was filtered, and ethanol was evaporated under reduced pressure. The residue was then dissolved in 10 ml of ethyl acetate. Thereafter the ethyl acetate layer was washed with water, 10 ml of water was added thereto, and the solution was adjusted to a pH of 8.0 with an aqueous solution of sodium hydrogencarbonate. The water layer was collected and adjusted to a pH of 2.0 with dilute hydrochloric acid and stirred. The precipitated crystals were then filtered and 0.8 g of 7-phenylacetamido-3-methyl-3-cephem-4-carboxylic acid having a melting point of 187° to 189°C were obtained.

EXAMPLE 8

1. A 5.0 g amount of the p-nitrobenzyl ester of penicillin-V.S.-oxide, 69 mg of 98%-orthophosphoric acid and 180 mg of diethylsulfide were dissolved in 20 ml of dioxane, and the mixture was reacted at 95° to 100°C for 12 hours. The procedure of Example 1-(1) was repeated under the same reaction conditions, and 3.6 g (74.6%) of the 4-nitrobenzyl ester of 7-phenoxyacetamido-3-methyl-3-cephem-4-carboxylic acid having a melting point of 188° to 190°C were obtained.

2. A 2 g quantity of the crystals thus obtained were dissolved in 50 ml of ethanol, and 2 g of palladium on carbon were added to the mixture. The catalytic reduction was conducted under 5 to 10 atm of hydrogen pressure. After the reduction reaction, the catalyst was filtered, and ethanol was evaporated under reduced pressure. The residue was then dissolved in 10 ml of ethyl acetate. After the ethyl acetate layer was washed with water, 10 ml of water was added thereto, and the solution was adjusted to a pH of 8.0 with an aqueous solution of sodium hydrogencarbonate. The water layer was collected and was adjusted to a pH of 2.0 with dilute hydrochloric acid. The precipitated crystals were filtered and 0.87 g (60%) of white crystals of 7-phenoxyacetamido-3-methyl-3-cephem-4-carboxylic acid having a melting point of 183° to 185°C were obtained.

EXAMPLE 9

1. A 4.68 g amount of the phenacyl ester of penicillin-G.S.-oxide, 69 mg of 98%-orthophosphoric acid and 180 mg of diethylsulfide were dissolved in 25 ml of dioxane, and the mixture was reacted at 95° to 100°C for 12 hours. The procedure of Example 1-(1) was repeated under the same reaction conditions, and 3.7 g (82.2%) of the phenacyl ester of 7-phenylacetamido-3-methyl-3-cephem-4-carboxylic acid having a melting point of 202° to 204°C were obtained.

2. A 3 g amount of the crystals thus obtained were dissolved in 10 ml of dimethylformamide, and 1 g of sodium thiophenolate was added to the mixture at 0°C. The mixture was allowed to stand for 16 hours. A 100 ml quantity of ethyl acetate was added to the reaction mixture and the precipitated crystals were filtered. The filtrate was dissolved in a small amount of water and the solution was adjusted to a pH of 2.0 with hydrochloric acid. The precipitated crystals were filtered and 1.6 g of white crystals of 7-phenylacetamido-3-methyl-3-cephem-4-carboxylic acid having a melting point of 189° to 191°C were obtained.

EXAMPLE 10

A 3.73 g amount of the methyl ester of penicillin-G.S.-oxide, 69 mg of 98%-orthophosphoric acid and 180 mg of diethylsulfide were dissolved in 20 ml of dioxane, and the mixture was reacted at 95° to 100°C for 12 hours. Then, the solvent was evaporated under reduced pressure, and ethanol was added to the residue. The mixture was allowed to stand to cool, and the precipitated crystals were then filtered. By this procedure was obtained 2.4 g (69.4%) of the methyl ester of 7- phenylacetamido-3-methyl-3-cephem-4-carboxylic acid having a melting point of 189° to 191°C.

EXAMPLE 11

1. A 5.0 g quantity of the 3,5-di(tert-butyl)-4-hydroxybenzyl ester of penicillin-G.S-oxide was dissolved in 25 ml of dioxane, and 100 mg of 98%-orthophosphoric acid and 150 mg of dibutylsulfide were added to the mixture. The mixture was reacted at 95° to 100°C for 12 hours. Afterwards, the solvent was evaporated under reduced pressure, and the crystals obtained by the addition of water were extracted with chloroform. The chloroform layer was washed with ether, and was dried with anhydrous magnesium sulfate. Chloroform was evaporated under reduced pressure, and ether was added to the residue. The crystals obtained were filtered and 4.1 g (84.4%) of the 3,5-di-(tert-butyl)-4-hydroxybenzyl ester of 7-phenylacetamido-3-methyl-3-cephem-4-carboxylic acid were obtained.

2. A 1 g amount of the ester thus obtained was dissolved in 5 ml of methylisobutylketone, and 0.36 g of potassium 2-ethylhexonoate in 2 ml of nor-butanol was added to the solution. The mixture was allowed to stand overnight, and the precipitated crystals were filtered and dissolved in water. The solution was adjusted to a pH of 2.5 with dilute hydrochloric acid, and the precipitated crystals were filtered. By this procedure was obtained 0.52 g of white crystals of 7-phenylacetamido-3-methyl-3-cephem4-carboxylic acid having a melting point of 181° to 185°C.

EXAMPLE 12

A 2.5 g amount of the pivaloyloxymethyl ester of α-azido-benzylpenicillin-S-oxide was dissolved in 25 ml of dioxane, and 50 mg of 98%-orthophosphoric acid and 100 mg of tetrahydrothiophene were added to the mixture. The mixture was reacted at 95° to 100°C for 10 hours. Then, the solvent was evaporated under reduced pressure, and ethanol was added to the residue. The solution was allowed to stand to cool, and the crystals obtained were filtered. By this procedure was obtained 2.05 g (82%) of the pivaloyloxymethyl ester of 7-(α-azido-phenylacetamido)-3-methyl-3-cephem-4-carboxylic acid having a melting point of 107° to 109°C.

EXAMPLE 13

1. A 2 g amount of the $\beta,\beta,\beta$-trichloroethyl ester of D(-)-α-($\beta,\beta,\beta$-trichloroethoxycarbonylamino)-benzyl-penicillin-S-oxide was dissolved in 20 ml of dioxane, and 30 mg of 98%-orthophosphoric acid and 80 mg of diethylsulfide were added to the solution. The mixture was reacted at 95° to 100°C for 12 hours. Thereafter, the solvent was evaporated under reduced pressure, and carbon tetrachloride was added to the residue. The mixture was allowed to stand to cool, and the crystals obtained were filtered. By this procedure was obtained 1.4 g (80.2%) of the $\beta,\beta,\beta$-trichloroethyl ester of 7-[D(-)-α-($\beta,\beta,\beta$-trichloroethoxycarbonylamino)phenylacetamido]-3-methyl-3-cephem-4-carboxylic acid having a melting point of 93° to 95°C.

2. A 1.4 g quantity of the $\beta,\beta,\beta$-trichloroethyl ester obtained as described in 13-(1) was dissolved in a mixed solvent of 10 g of methylisobutylketone and 40 ml of formic acid. An 8 g quantity of zinc powder was added to the mixture, and the mixture was reacted at −5°C for 1 hour. After the reaction, all insoluble material was filtered, and the filtrate was concentrated to 30 ml under reduced pressure. To the filtrate thus obtained was added 60 ml of methanol containing 1.2 ml of conc. hydrochloric acid whereby the methyl formate derivative was formed. Then, the product obtained was concentrated at a temperature below 35°C under reduced pressure (20 mmHg.) until only the methyl formate derivative remained. The residue was poured into 80 ml of ether, and after stirring, a water layer was collected. To the aqueous layer was added 1.6 ml of ethyl acetate, and after the mixture was heated to 40°C, the mixture was adjusted to a pH of 4.0 with triethylamine at the same temperature. Thereafter, 40 ml of acetone was added to the mixture, and the mixture thus obtained was allowed to stand to cool. The precipitated crystals were then filtered and 0.61 g (70%) of cephalexin was obtained.

EXAMPLE 14

A 4.82 g quantity of the $\beta,\beta,\beta$-trichloroethyl ester of penicillin-G.S-oxide, 98 mg of 85%-orthophosphoric acid and 220 mg of γ-hydroxypropylmethylsulfide were dissolved in 25 ml of dioxane, and the mixture was reacted at 95° to 100°C for 9 hours. Thereafter, the solvent was evaporated, and ethanol was added to the residue. The mixture obtained was allowed to stand to cool, and the crystals obtained were filtered to yield 3.98 g (85.7%) of the $\beta,\beta,\beta$-trichloroethyl ester of 7-phenylacetamido-3-methyl-3-cephem-4-carboxylic acid having a melting point of 160° to 161°C.

Table III shows the yields obtained for the same reaction wherein the sulfide component of the catalyst was varied in each instance.

TABLE III

| Sulfides | Yields |
| --- | --- |
| [CH$_3$(CH$_2$)$_{11}$OCCH$_2$CH$_2$—]$_2$S <br> ‖ <br> O | 80.1% |
| (CNCH$_2$CH$_2$)$_2$S | 59.7% |
| (HOOCCH$_2$CH$_2$)$_2$S | 66.8% |
| 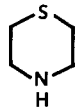 | 65.0% |

The deesterification procedure of Example 1–(2) was repeated for the esters obtained under the same reaction conditions. By this procedure was obtained 7-phenylacetamido-3-methyl-3-cephem-4-carboxylic acid.

EXAMPLE 15

A 4.82 g amount of the $\beta,\beta,\beta$-trichloroethyl ester of penicillin-G.S-oxide, 190 mg of aluminum bromide hexahydrate, and 160 mg of diethylsulfide were dissolved in 35 ml of tert-amylalcohol, and the mixture thus obtained was reacted at 98° to 102°C for 6.5 hours. Thereafter, the solvent was evaporated under reduced pressure, and the residue obtained was dissolved in chloroform. The solution thus obtained was washed with dilute hydrochloric acid and washed with water, and thereafter the chloroform was evaporated under reduced pressure. Ether was added to the residue and the mixture was then allowed to stand to cool. The crystals obtained were filtered and 2.76 g (59.5%) of the β,β,β-trichloroethyl ester of 7-phenylacetamido-3-methyl-3-cephem-4-carboxylic acid were obtained.

The procedure of Example 1-(2) was repeated for the ester obtained under the same reaction conditions. By this procedure was obtained 7-phenylacetamido-3-methyl-3-cephem-4-carboxylic acid.

EXAMPLE 16

A 4.82 g amount of the β,β,β-trichloroethyl ester of penicillin-G.S-oxide, 170 mg of 4-toluene-sulfonic acid and 160 mg of diethylsulfide were dissolved in 25 ml of dioxane, and the mixture was reacted at 95° to 100°C for 8 hours.

The procedure of Example 1-(1) was repeated for the reaction mixture under the same reaction conditions. By this procedure was obtained 2.38 g (51.3%) of the β,β,β-trichloroethyl ester of 7-phenylacetamido-3-methyl-3-cephem-4-carboxylic acid.

The deesterification procedure of Example 1-(2) was repeated for the ester obtained under the same reaction conditions, and 7-phenylacetamido-3-methyl-3-cephem-4-carboxylic acid was obtained as the product.

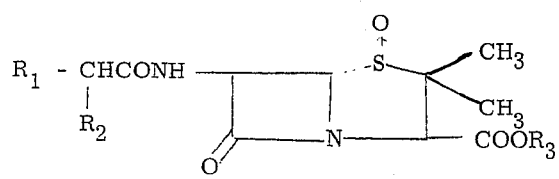

wherein $R_1$, $R_2$ and $R_3$ are as defined before in the presence of a catalyst consisting of an acid selected from the group consisting of phosphoric acids, sulfonic acids and Lewis acids and a sulfide, of the formula $R_5$—S—$R_6$, the amount of said catalyst being from .05 to 0.2 mole of an acid and from 0.01 to 0.3 mole of a sulfide per mole of said 6-acylamino- penicillanic acid ester S-oxide; wherein $R_5$ and $R_6$ are alkyl of 1 to 10 carbon atoms, allyl, vinyl, cyclohexyl, 3,3,5-trimethylcyclohexyl, chloroalkyl of 1 to 2 carbon atoms, hydroxy alkyl of 2 to 3 carbon atoms, carboxy alkyl of 1 to 2 carbon atoms, dodecoxy carbonyl ethyl, cyanoethyl, nitroethyl, mercapto ethyl, aminoethyl, methylthio propyl, methoxyethyl, methylthio ethyl, propargyl, mono-carbocyclic aryl or mono carbocyclic aralkyl wherein alkyl has 1 to 2 carbon atoms.

2. The process of claim 1, wherein said inorganic phosphoric acid is selected from the group consisting of orthophosphoric acid, pyrophosphoric acid and polyphosphoric acid.

3. The process of claim 1, wherein said organic phosphoric acid is selected from the group consisting of

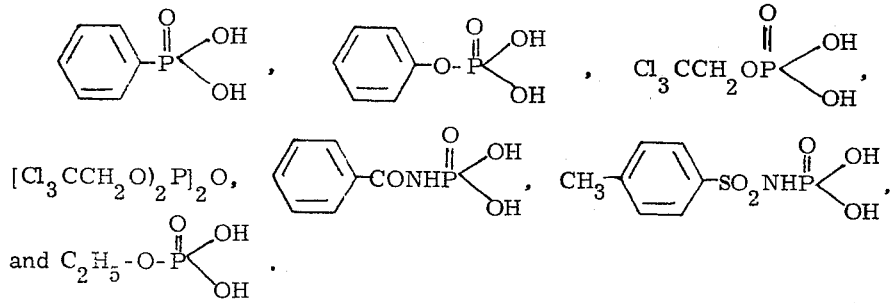

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing a 7-acylamino-3-methyl-3-cephem-4-carboxylic acid ester of the formula

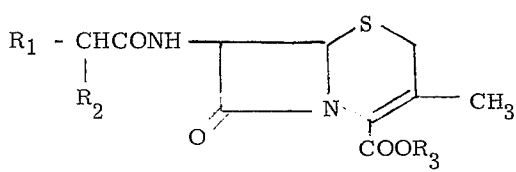

wherein $R_1$ represents hydrogen, lower alkyl having from 1 - 5 carbon atoms, phenyl, or phenyloxy; $R_2$ represents hydrogen, lower alkyl having from 1 - 5 carbon atoms, halogen, azido, or N-protected amino; and $R_3$ represents an ester group, which comprises the step of heating 6-acylamino-penicillanic acid ester S-oxide represented by the formula 4. The process of claim 1, wherein said organic sulfonic acid is 4-toluenesulfonic acid.

5. The process of claim 1, wherein said Lewis acid is aluminum bromide.

6. The process of claim 1, wherein the quantity of the sulfide component of the catalyst ranges from 0.01 to 0.2 mole per mole of 6-acylaminopenicillanic acid ester S-oxide.

7. The process of claim 1, wherein the quantity of the acid component of the catalyst ranges from 0.05 to 0.2 mole per mole of 6-acylamino-penicillanic acid ester S-oxide.

8. The process of claim 1, wherein said 6-acylaminopenicillanic acid ester S-oxide is heated to from 80° to 130°C in the presence of said catalyst.

9. The process of claim 1, wherein said catalyst is a combination of an inorganic phosphoric acid and diethylsulfide.

10. The process of claim 2 wherein said sulfide is $C_2H_5$—S—$C_2H_5$, $(CH_3)$—CH—S—$C_2H_5$, nor — $C_6H_{13}$—S—$C_2H_5$, $(Cl\ CH_2\ CH_2)_2$ S, cyclohexyl-S-$C_2H_5$, phenyl—S—$C_2H_5$, benzyl—S—$C_2H_5$, $C_3H_7$—S—$C_3H_7$, $C_4H_9$—S—$C_4H_9$, $(CN\ CH_2\ CH_2)_2$ S, $(HOOC$—$CH_2$—$CH_2)_2$ S, $HOCH_2$—$CH_2$—$CH_2$—S—$CH_3$, or

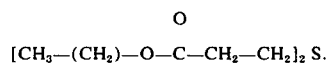

* * * * *

Notice of Adverse Decision in Interference

In Interference No. 99,610, involving Patent No. 3,890,314, T. Ishimaru and Y. Kodama, PROCESS FOR PRODUCING 7-ACYLAMINO-3-METHYL-3-CEPHEM-4-CARBOXYLIC ACIDS, final judgment adverse to the patentees was rendered Oct. 27, 1977, as to claim 10.

[*Official Gazette February 14, 1978.*]